June 21, 1966 J. J. CHRISTENSEN 3,256,921

ANTI-SKID DEVICE

Filed Jan. 18, 1965 5 Sheets-Sheet 1

INVENTOR.
JENS JUUL CHRISTENSEN
BY Woodling, Krost, Granger and Rust,
ATTORNEYS

ANTI-SKID DEVICE

Filed Jan. 18, 1965

INVENTOR.

JENS JUUL CHRISTENSEN

BY Woodling, Krost, Granger and Rust.

ATTORNEYS

INVENTOR.
JENS JUUL CHRISTENSEN
BY Woodling, Krost, Granger and Rust
ATTORNEYS

INVENTOR.
JENS JUUL CHRISTENSEN
BY Woodling, Krost, Granger and Rust.
ATTORNEYS

ANTI-SKID DEVICE

Filed Jan. 18, 1965 5 Sheets-Sheet 5

INVENTOR.

JENS JUUL CHRISTENSEN

BY

ATTORNEYS

United States Patent Office 3,256,921
Patented June 21, 1966

3,256,921
ANTI-SKID DEVICE

Jens Juul Christensen, Bedford, Ohio, assignor of one-tenth to Bruce B. Krost

Filed Jan. 18, 1965, Ser. No. 429,941
48 Claims. (Cl. 152—229)

This application is a continuation-in-part of my pending application Serial No. 352,517, filed March 17, 1964 and since abandoned.

My invention relates to anti-skid devices for tires and to tires adapted to carry such devices.

An object of my invention is the improved construction of an anti-skid device adapted for ready mounting on and demounting from an automotive tire of rubber-like material.

Another object is the provision of an improved tire construction arranged for receiving and holding such anti-skid devices in a position to protrude from the outer circumferential surface of the tire tread.

Another object is the provision of an improved combination of tire and anti-skid device so arranged in construction and assembly as to produce unique and useful means of assembly and improved results in the resistance to skidding.

Another object is the provision of an anti-skid device constructed ot provide a maximum of protection against skidding and which is readily adaptable for mounting on and demounting from an automotive tire.

Another object is the provision of a unique arrangement for connecting anti-skid devices to automotive tires to hold stud portions of the devices firmly and yet in a position to protrude radially outwardly from the outer circumferential surface of the tire to engage effectively the surface being traveled by the tire.

Another object is the provision of such a device which resists wear and which is so mounted and constructed as to accommodate for resilient reaction between the tire and the surface being traveled by the tire, such as the road surface.

Another object is the provision of improved means which are both efficient and economically for the ready mounting and demounting of anti-skid studs or the like in a position to protude radially from the tread of a tire.

Another object is the provision of an improved tire construction arranged for ready mounting and demounting of anti-skid devices to the same.

Another object is the provision of anti-skid devices so constructed and arranged as to accommodate themselves to the form and construction of commercially available tires.

Another object is the provision of improved devices of the above described character which provide the maximum of efficiency, the maximum of ease for mounting and demounting, and which are economical to fabricate.

Another object is to provide improved and useful results in a novel manner.

Other objects and a fuller understanding of my invention may be had by referring to the following description and claims, taken in conjunction with the accompanying drawings, in which:

In FIGURE 8 such a device is shown in broken lines removed from the tire tread and another like device is also shown in full lines mounted to the tire tread;

Figure 1:
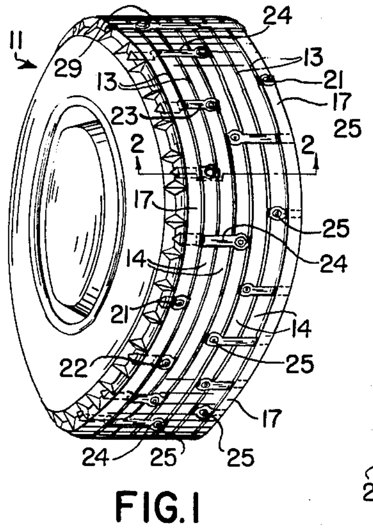
FIGURE 1 is a perspective view of a tire upon which is mounted a plurality of the preferred form of my anti-skid device, which preferred form has a number of modified constructions adapted to the particular location on the tire where the device is to be mounted.

In FIGURE 1 a tire to which the preferred form of my anti-skid device may be mounted is denoted generally by the reference character 11. This tire 11 has a tread portion 12 which is of resilient rubber-like material having the relative firmness and resiliency of the tread of the usual automotive tire. By "automotive tire" I mean to include the usual automobile tire, truck tire, tractor tire and the like. As seen in both FIGURES 1 and 2, the tread portion 12 of the tire 11 has a plurality of circumferentially directed grooves 13 extending therearound and inwardly from the outer circumferential surface. These grooves 13 leave lands or ribs 14 between the grooves. The ribs between the side walls 15 of the tread portion 12 and the next adjacent groove 13 are denoted by the reference character 17. Thus in FIGURE 5 there are shown two ribs or lands 17 and between them are shown five ribs or lands 14. The side walls 15 along the opposite sides of the tread portion 12 may be straight or may have a plurality of radially directed buttressed portions 16 creating a somewhat scalloped or undulating form to the walls on the opposite sides of the tire tread. The lands or ribs, both those denoted as 14 and those denoted as 17, are directed radially outward of the tire and run in a generally circumferential direction about the tire. Each groove 13 has opposite walls which are disposed in planes generally radial of the tire.

In the form of my device illustrated in FIGURES 1, 2, 3 and 4, the tire is provided with a plurality of openings 18 which are formed in the lands or ribs 17 on the opposite sides of the tire. These openings 18 are generally slanted or sloped at an incline as they extend from the respective grooves 13 radially inward and axially toward the respective side walls 15. These openings 18 may be formed by drilling, molding or burning the holes through the rubber-like material from the wall 15 to the closest side wall of the adjacent groove 13 near the bottom thereof. In the case of tires prepared for the devices at the factory, these openings 18 may be made during the molding operation. In tires previously constructed, then the openings may be readily formed by the use of drills or by pressing heated rods into the rubber-like material to form the openings as indicated. The openings 18 are spaced substantially equidistantly around the circumferential extent of the tire and on opposite axial sides thereof. The devices mounted on the tire 11 vary in accordance with the position that is to be taken by the stud portion of the device. Those devices where the stud is to be midway between the axial ends of the tire have one length and form, whereas those devices where the stud portion is to be closer to the opposite ends of the tire have other lengths and forms utilized to accommodate to the variation in positions of the stud portions.

Figure 4:
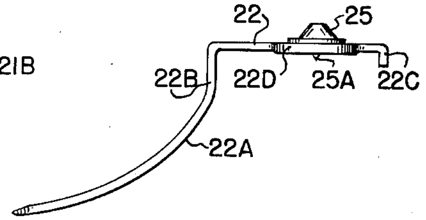
FIGURE 4 is an enlarged view of another form of anti-skid device of the kind mounted on the tire shown in FIGURE 1.

In FIGURE 4 there is illustrated one of the anti-skid devices mounted to the tire 11 in FIGURE 1. This anti-skid device shown in FIGURE 4 is formed so as to extend over but one land or rib 14. The device shown in FIGURE 4 has an anchoring portion 22 to which the stud portion 25 is secured. This anchoring portion 22 has a cupped portion 22D to which the stud portion 25 is secured. This cupped portion 22D is of wider width than the main body portion of the anchoring portion 22 and has a downwardly directed arcuate curved edge so disposed as to bite into or frictionally engage with the rubber-like material of the outer surface of the tire tread. The stud portion 25 also has an inwardly directed point 25A which is adapted to bite into or frictionally engage the tread. Extending downwardly at an angle to the body of the anchoring portion 22 is an angle portion 22B. Extending in a curve, as shown from the lower end of the portion 22B, is a curved portion 22A terminating in a relatively fine point. At the opposite end of the body portion of the anchoring portion there is a turned down end portion 22C.

Figure 2:
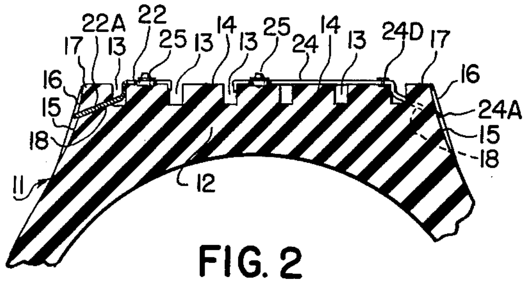
FIGURE 2 is a cross-sectional view of the tread portion of the tire shown in FIGURE 1 and illustrates details of the mounting of the anti-skid devices thereon.

As seen in FIGURE 2, the anchoring portion 22 is so positioned over a rib 14 that the stud portion 25 carried thereby protrudes radially outward from the tire tread and the turned down end 22C abuts a side wall 15 of an adjacent groove 13. The angle portion 22B extends radially inward next adjacent to the wall of the rib 14 which rib is next adjacent to the rib or land 17. The curved portion 22A extends across the respective groove 13 and into the opening 18 formed in the land 17. The opening 18 is relatively straight whereas the curved portion 22A is in a gradual curve. This curve facilitates the insertion of the portion 22A into the opening 18 from the groove 13. The anchoring portion 22 is metal and is somewhat resilient so that the curved portion 22A yields or gives and thus permits the curved portion 22A to align itself within the opening 18. The resilient flexibility of the anchoring portion 22 is such as to urge the body portion of the anchoring portion 22 downwardly upon the top of the respective land or rib 14 so as to press the edges of the cupped portion 22D and point 25A downwardly into the rubber-like material. The end 22C also aids in preventing lateral movement of the anchoring portion relative to the outer circumferential surface of the tread. When the device shown in FIGURE 4 is mounted to the tire, it appears as shown on the left side of the view of FIGURE 2.

Figure 3:
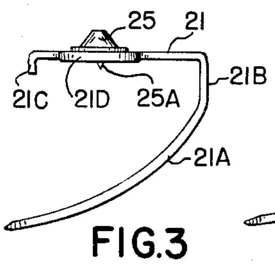
FIGURE 3 is an enlarged view of one of the forms of anti-skid device of the kind mounted on the tire shown in FIGURE 1.

When it is desired to have a stud 25 positioned over a land or rib 17 at an axial end of the tire, then the form shown in FIGURE 3 is utilized. Here an anchoring portion 21 also of resiliently flexible metal has an angle portion 21B extending downwardly from the body portion and curved portion 21A directed as shown in FIGURE 3. It is to be noted that in FIGURE 3 the curve is directed in an opposite direction from that shown in FIGURE 4. This permits the curved portion 21A to be mounted in an opening 18 just as in the case of the device shown in FIGURE 4 but by reason of the reverse angularity illustrated, the stud portion 25 thereof is positioned over a land 17 near the end of the tire. The bent down end 21C engages over the outer edge of the land 17 so as to help secure the anchoring device into position. Again, the resiliency of the anchoring portion is such that the stud portion 25 is resiliently urged downwardly into engagement with the land 17.

Other anti-skid devices mounted upon the tire 11 of FIGURE 1 are similar to that illustrated in FIGURE 4 except for the length of the body of the anchoring portion thereof. For example, in FIGURE 1 there is shown an anchoring portion 23 which has a length wherein the body extends over the top of two ribs or lands. Also there is shown an anchoring portion 24 which has a length adapted to extend the body over three ribs or lands. This extends the body portion thereof so as to position the stud portion 25 carried thereby over the central or intermediate rib or land 14. In the case of long anchoring portions, such as anchoring portion 24, it is desired to have a wear-resisting button 24D mounted on the body of the anchoring portion adjacent to the angle portion which extends down into the groove 13 and across to the opening 18. This button 24D aids in resisting any wear that might occur at that point.

It is to be seen that the anti-skid devices having the varied forms of anchoring portions 21, 22, 23 and 24 are substantially the same in function. Anchoring portions 22, 23 and 24 vary as to the length of the body thereof so as to accommodate to the different positions where the stud portions are to be located. Anchoring portion 21 differs from anchoring portion 22 in the direction of the curve of the curved portion thereof which is extended through an opening 18. It is thus seen that the anti-skid devices may be readily mounted and demounted from a tire and so arranged about the circumferential length and extent of the tire that studs 25 may be located as desired. The resiliency of the anchoring portions coupled with the resiliency of the rubber-like material of the tread is such that the devices may be readly mounted and demounted from the tire and at the same time the devices are firmly and securely held in place. Centrifugal force which would tend to throw the devices off of the tire is resisted by the same grip of the devices to the tire tread. At the same time, by properly tilting and pulling the devices, they may be removed from the tire as desired. Also by properly tilting the devices and moving them so as to force the curved portions through the respective openings 18 and then by releasing the devices so that the flexibility of the tire tread and of the anchoring portions presses the stud portions downwardly to the positions illustrated, the devices are firmly held in position against dislocation during travel of the tire over a surface such as over a road.

Figure 5:
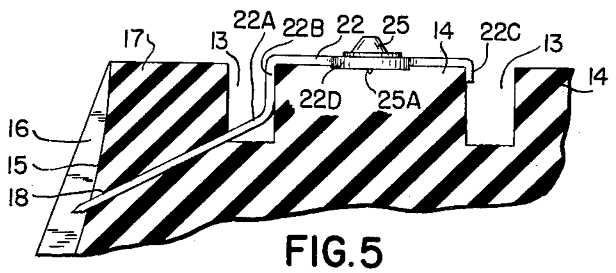
FIGURE 5 is an enlarged sectional view of a device like that shown in FIGURE 4 mounted in a portion of tire tread of a tire such as shown in FIGURE 1.

In FIGURE 5 there is illustrated in enlarged form a mounting of a device like that shown in FIGURE 4 to the tire tread and particularly to a rib 15 next adjacent to an end rib 17.

Figure 6:
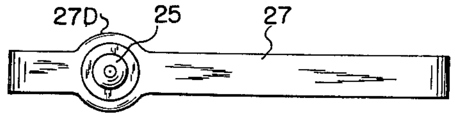
FIGURE 6 is a plan view of a modified form of my anti-skid device.
Figure 7:
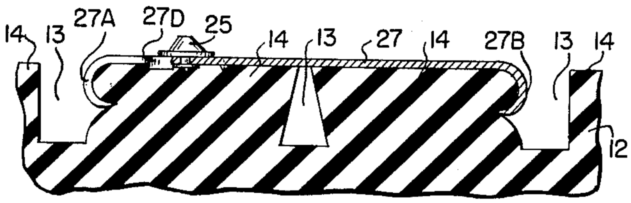
FIGURE 7 is an enlarged sectional view of a portion of a tire tread and showing the form of device shown in FIGURE 6 mounted in position on the tread.

In FIGURES 6 and 7 there is illustrated a modified form of my device. In this modified form, the anchoring portion 27 is also of flat flexibly resilient steel having a body portion adapted to engage the outer circumferential surface of the tire tread 12. In the form illustrated in the FIGURES 6 and 7, the length of the anchoring portion 27 is such that it extends over two ribs or lands 14. In this form of the anchoring portion of the device, there are opposite ends formed to clasp or tightly embrace the walls of the embraced ribs as illustrated. On the left-hand side, the curved end portion is denoted by the reference character 27A and on the right-hand side, the curved end portion is denoted by the reference character 27B. These curved portions 27A and 27B extend away from the plane of the anchoring portion 27 and thence back toward each other so as to define a limited space therebetween, the ends of the portions 27A and 27B being somewhat pointed or edged. It is seen that the dimensions of the anchoring portion 27 relative to the width of the ribs 14 is such that the intermediate groove 13 is somewhat deformed, wherein the walls are inclined toward each other. Also, the walls of the grooves 13 which are engaged by the curved opposite ends 27A and 27B are squeezed and compressed as illustrated, whereby the anchoring portion 27 of the device is firmly interlocked with the rubber-like material of the two adjoining ribs 14.

The device illustrated in FIGURES 6 and 7 is mounted to the position shown in FIGURE 7 by taking the unmounted device as shown in FIGURE 6 and disposing it longitudinally of one of the grooves 13, such as the groove 13 on the right-hand side in FIGURE 7. In this arrangement, the curved end 27B is positioned down within the groove 13 so that the body of the anchoring portion 27 is positioned at about the level of the top surface of the ribs. The anchoring portion 27 is then rotated at about right angles to the groove 13 in which the curved end 27B is located and is then manually pulled away from the right-hand groove 13 to the left as seen in FIGURE 7, to the extent that the curved end 27A may move downwardly into the left-hand groove 13 as seen in FIGURE 7. When both of the ends 27A and 27B are down within the respective grooves, then further pulling on the anchoring portion 27 to the left is discontinued. The resiliency of the rubber-like material of the ribs is such that the anchoring portion then moves to a position of equalibrium, that is, to the position shown in FIGURE 7. The dimension of the anchoring portion relative to the ribs is such that the parts then assume the relative positions shown in FIGURE 7.

For the removal of the device, the steps are reversed. For example, the end 27A is pulled against the resiliency of the rubber-like material of the ribs to the extent that the curved end 27A disengages the side wall of the rib, the anchoring portion 27 is then tilted upwardly so that the end 27A clears the rib, and then the anchoring portion 27 is rotated so as to be substantially over the groove 13 on the right-hand side. This then permits the end 27B to clear the rib and the device 27 may be lifted upwardly and away from the tire tread. If desired, a pair of pliers or other suitable tool may be used for seizing an end of the anchoring portion during the described manipulation. As seen, the stud portion 25 is positioned along the length of the anchoring portion so as to locate the stud portion 25 over one of the ribs 14.

Figure 8:
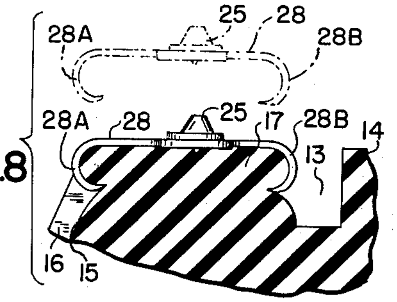
FIGURE 8 is a view of a form of device somewhat like that shown in FIGURES 6 and 7 but which is shorter so as to embrace but one rib of the tread whereas the device shown in FIGURE 7 embraces two ribs of the tread.

In FIGURE 8, the device has an anchoring portion 28 somewhat similar to that of the anchoring portion 27 illustrated in FIGURES 6 and 7. In the form illustrated in FIGURE 8, the anchoring portion 28 is of a length dimensioned to embrace but a single rib or land. In the particular arrangement of FIGURE 8, a land 17 at one end of the tire is embraced. The device positioned before assembly to the tire tread is shown in broken lines and after assembly to the tire tread is shown in full lines. The mounting of the device to the tire tread is similar to that described in connection with FIGURE 7. In this arrangement, the end 28 is positioned within the groove 13 and the end 28A is positioned adjacent the outer or side wall 15 of the tire. In the mounting of the device, the anchoring portion 28 is so positioned as to first be aligned with the groove 13, with the end portion 28B down within the groove 13. The anchoring portion 28 is then turned at right angles and pulled away from the groove 13 to a position that permits the end 28A to be moved downwardly and then released so that the anchoring portion 28 assumes its position in equilibrium illustrated in FIGURE 8. The opposite walls of the land 17 are compressed as illustrated so that the anti-skid device is firmly grasped or anchored to the rib 17. Removal is effected by reversing the steps as previously described. A device of the general type shown in FIGURES 6, 7 and 8 but having an anchoring portion sufficient to span all of the lands or ribs, that is, to extend between sides 15 of the tire, is indicated by the reference character 29 and is shown mounted on the top of the tire shown in FIGURE 1.

Figure 11:
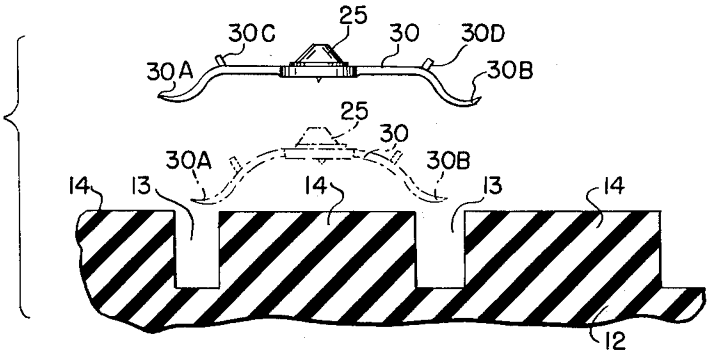
FIGURE 11 is a view of a modified form of my device showing in full lines the device prior to being mounted to the tire tread and showing in broken lines its bowed or arched position upon being resiliently constrained prior to being mounted to the tire tread.
Figure 12:
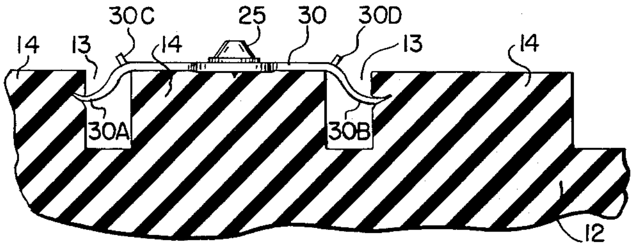
FIGURE 12 is a view of the same section of the tire tread shown in FIGURE 11 but with the form of the device illustrated in FIGURE 11 in anchored position, that is, secured to the tire tread.

In FIGURES 11 and 12 another form of the device is illustrated. In the latter form, the anchoring devie denoted generally by the reference character 30, also of resiliently flexible metal, has curved ends 30A and 30B pointed generally away from each other and slightly upward at their terminals, as illustrated. In this form, the ends 30A and 30B are disposed so as to penetrate or protrude into the farthest spaced walls of the grooves 13 in which the ends 30A and 30B are positioned. For mounting the form of device shown in FIGURES 11 and 12, the device is first positioned directly over a rib 14, such as shown in solid lines in FIGURE 11. The anchoring portion 30 is then resiliently bowed or flexed into the arched form shown in dotted lines in FIGURE 11. The tool-engaging lugs 30C and 30D are struck up or otherwise formed on the anchoring portion 30 in such manner that a tool, such as a pair of pliers, may readily engage the portions 30C and 30D for resiliently arching or bowing the anchoring portion 30 to the form illustrated in dotted lines. When the device as shown in dotted lines in FIGURE 11 is lowered so that the ends 30A and 30B may readily move down into the respective grooves 13 and released, then the anchoring portion resumes its normal reflexed position and the ends 30A and 30B move outwardly to penetrate or protrude into the rubber-like material of the opposite walls of the grooves 13 as illustrated in FIGURE 12. The inter-engagement of the ends 30A and 30B with the material of the interengaging walls is such as to firmly hold the anti-skid device downwardly to the position shown in FIGURE 12 wherein the stud portion 25 carried by the anchoring portion 30 is firmly pressed downwardly by reason of the combined flexibility of the anchoring portion 30 and the rubber-like material of the tread.

To remove the form of device shown in FIGURES 11 and 12, the steps are reversed. A tool, such as a pair of pliers, seizes the engaging portions 30C and 30D and moves them together so as to resiliently bow or arch the anchoring portion 30 and then the anchoring portion is raised upwardly so as to disengage the ends 30A and 30B from the side walls of the grooves, and the anchoring portion released when clear of the grooves.

It is to be understood, of course, that the dimensions of the device illustrated in FIGURES 11 and 12 may be modified so that it may span or extend over two, three or more ribs of the tire as desired. Similarly, the other forms of the device may be modified in dimensions so that any desired number of ribs may be spanned. Also the stud portions 25 carried by the anchoring portions may be positioned on the anchoring portions to such positions as desired for locating the stud portions on the outer circumferential surface of the tire where needed. It is further understood, of course, that the anti-skid devices of the forms illustrated in all views of the drawings may be located around the circumferential extent of the tire at desired intervals and at desired places along the width of the tread, that is, the axial length of the tire. In some instances, a considerable or large number of devices may be utilized on a tire whereas in other instances relatively few may be utilized, all depending on road and operating conditions.

Figure 9:
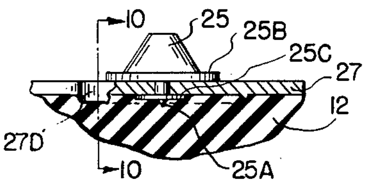
FIGURE 9 is an enlarged view partially in section showing the details of the securement of the stud portion to the anchor portion of the devices similar to the kind shown in FIGURES 1 to 8, and 11 and 12.
Figure 10:
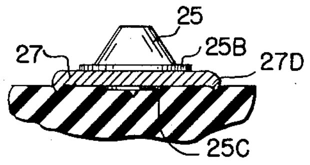
FIGURE 10 is an endwise view of the device as shown in FIGURE 9 looking in the direction of the arrows 10—10 of FIGURE 9.

In FIGURE 9 there is shown a detail of the mounting of a stud portion 25 to the different forms of anchoring portions, such as the anchoring portion 27 of one form of the invention. The stud portion 25 is preferably made of carbide, a hard alloy steel, or other suitable wear-resisting material. In general, the stud portion 25 is of a frusto-conical shape and has a flange portion 25B engaging the upper surface of the anchoring portion 27. The shank of the stud portion 25 extends through an opening in the anchoring portion 27 and terminates in a point 25A disposed to engage the rubber-like material of the tire tread. As seen in FIGURE 9, the outer edge of the cupped portion 27D of the anchoring portion 27 extends downwardly so as to bitingly engage the rubber-like material of the tread 12. A washer 25C is held to the shank of the stud portion 25 on the under surface of the anchoring portion 27 by upsetting or forging the lower end of the shank so as to firmly interlock the stud portion 25 with the anchoring portion 27. The view of FIGURE 10 also illustrates the structural arrangement and interengagement of the stud portion with the anchoring portion. It is to be understood that the small upper end of the stud portion 25 is directed to protrude radially outward from the tread of the tire.

Figure 13:
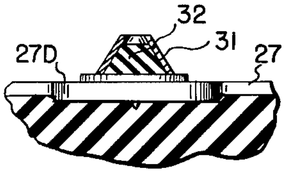
FIGURE 13 is an enlarged view partially in section showing a modified form of a stud construction which may be utilized in my device.

A modified form of a stud is illustrated in FIGURE 13. In this form of stud, a steel shell 31 contains a filler of rubber-like material 32. The shell 31 may be of mild or relatively cheap steel but which confines and holds the filler 32 of relatively hard rubber-like material. The rubber-like material is of the type which is relatively wear-resistant and sufficiently flexible to push out any snow, ice, or dirt which might enter the shell 31. As the shell 31 wears down, the filler of rubber-like material is positioned to meet the road surface and to form a serviceable anti-skid stud.

Figure 14:
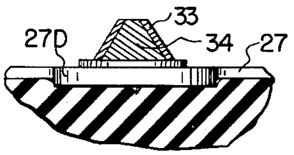
FIGURE 14 is an enlarged view partially in section showing another modified form of a stud construction which may be utilized in my device.

In FIGURE 14 is shown still another modified form of stud. In this form of FIGURE 14 there is a shell 33 which may be of mild steel or other suitable material which contains a core or filler 34 made of carbide or a hard alloy which is harder and more resistant than the shell 33. As carbide and some alloys are relatively brittle and tend to fracture, the shell 33 containing the core 34 tends to hold the core against fracture or breakage while the end of the point of the core is maintained in position for engagement with the road surface.

In FIGURES 15 to 30, there is illustrated modified anti-skid means utilizing novel and convenient means for maintaining the devices on the tire. The tire indicated by the reference character 36 in FIGURES 15, 16 and 19 has a tread of the usual summer or all-year-round type (as distinguished from a snow and mud tread). The tire tread has a plurality of ribs 37 extending generally circumferentially therearound divided by grooves 38 also extending generally circumferentially therearound. The tire tread has sides 39 on axially opposite sides of the tire which define with grooves 38 the outermost ribs 37.

Mounted on the tire 36 are a plurality of anti-skid devices. Each device includes a metal non-stretchable anchoring member adapted to extend across the outer surface of the tread in a generally axial direction, over one or a plurality of ribs. The anti-skid device adapted to extend over a plurality of ribs, such as over two ribs, has a relatively long anchoring member 40 having a length sufficient to extend over the plurality of ribs. The anti-skid device adapted to extend over only an outermost rib has a relatively short anchoring member 41 having a length sufficient to extend over the rib. Other than the lengths of the anchoring portions 40 and 41, the two forms of anti-skid devices on the tire 36 are the same.

Rigidly mounted on, and extending outwardly from each anchoring member 40 and 41 is a stud 42 so disposed as to extend radially of the tire into engagement with the road surface traveled by the tire. The stud 42 may be of steel, preferably hardened, and made integral with the anchoring member. The stud is of general frusto-conical shape and may be filled with a relatively hard rubber-like material as described in connection with FIGURE 13 or may be filled with a hard alloy or carbide as described in connection with FIGURE 14. Also, the stud may be of a carbide or other hard core, like the modified stud 42A illustrated in FIGURE 21, wherein the stud 42A is held by the modified anchor member 41A having means for gripping the core while permitting the smaller end of the core to protrude outwardly therefrom as shown.

Figure 15:
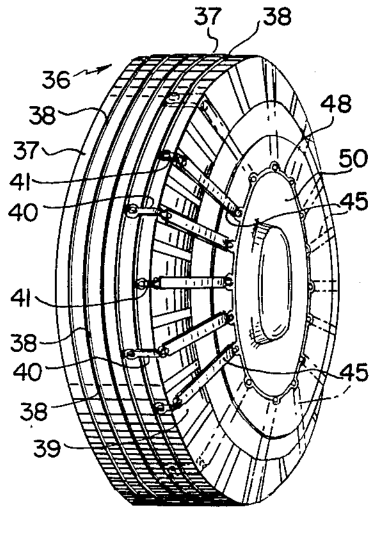
FIGURE 15 is a perspective view of a tire upon which is mounted a plurality of another modified form of my anti-skid device mounted by other holding means, which form has a number of modified constructions adapted to the location on the tire where the device is to be mounted.
Figure 16:
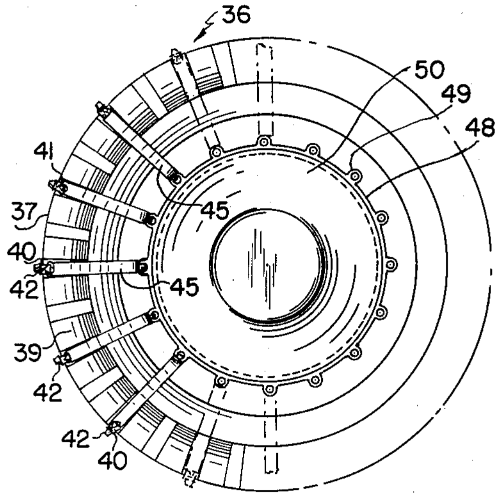
FIGURE 16 is a side view of the tire shown in FIGURE 15.

On the inner end of each anchoring member 40 and 41 is a flange or hook end 43 that readily fits into a groove 38 and engages a side thereof closest to the nearest side of the tire, that is, the side of the tire shown in FIGURES 15 and 16. The dimension of the flange or hook end 43 in a direction axially of the tire is less than the width of the groove 38 so that the flange or hook end 43 may be readily inserted radially into the groove without interference from its sides. The flange or hook end 43 is included at a small angle to a plane normal to the anchoring member 40 or 41, that is, it is tipped slightly under the anchoring member. In this way, the lower or extreme end of the flange or hook portion 43 tends to press into and compress the rubber-like material of the tread rib upon the anchoring member 40 or 41 being urged axially of the tire toward the nearest side of the tire. This gripping of the tread rib by the flange or hook end portion 43 resists radially outward movement of the anti-skid device from the tire tread and prevents dislodgment from the tire.

At the outer end of each anchoring member 40 and 41, that is, on the end adjacent the near side of the tire shown in FIGURES 15 and 16, there is formed integral with the anchoring member an outer hook end portion 44. Preferably, the anchoring member 40 or 41 and the inner flange or hook end 43 and outer hook end 44 are made of one piece of steel or other appropriate material having the desired strength and rigidity, and which is non-stretchable along the length of the anchoring member. As shown in the drawings, the outer hook end 44 is bent downwardly, that is, radially inward of the tire along the side of the tread, and then is bent outwardly to form a hook, the mouth or opening of which faces radially outward of the tire. The hook portion 44 is so formed and the length of the anchoring member is so proportioned that the rib or ribs disposed between the inner flange or hook portion 43 and the outer hook portion 44 are somewhat compressed or snugly engaged in a press fit by the opposed portions 43 and 44 which embrace the one or more ribs over which the anchoring portion extends.

Unique means are provided for holding the anti-skid devices to the tire 36. In the description of the tires 36 in FIGURES 15 and 16 and the tire 51 in FIGURE 22, the near side of the tire is that side shown in these figures. This near side is the side which is ordinarily disposed on the outside of the vehcle upon which the tire is mounted. In other words, it is this near side of the tire, which is the outer side, that is most readily accessible to a person positioned at a side of the vehicle.

Figures 22, 23, 24, 25, 26, 27, 28, 29, 31:
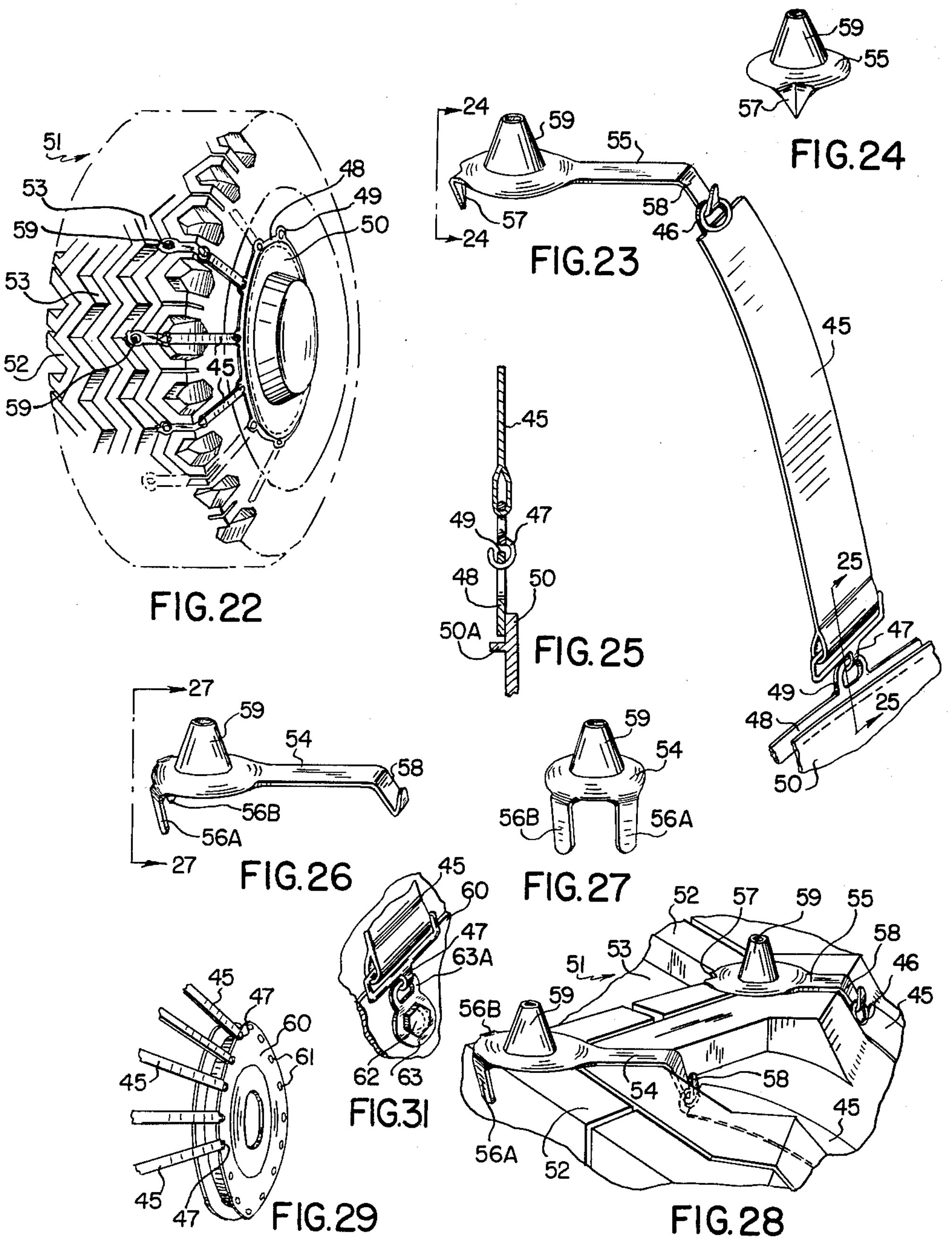
FIGURE 22 is a perspective view of a so-called snow and mud tire having a deep or thick tread and upon which is mounted a plurality of anti-skid devices having a form somewhat modified from that shown in FIGURES 15 to 18, inclusive, and adapted to that type of tread.
FIGURE 23 is an enlarged detail view of one of the anti-skid devices on the tire shown in FIGURE 22 and of the means for mounting it to the tire.
FIGURE 24 is an end view of the anti-skid device looking in the direction of the arrows 24—24 of FIGURE 23.
FIGURE 25 is a detail cross-sectional view of an inner portion of the mounting means shown in FIGURE 23, looking in the direction of the arrows 25—25 of FIGURE 23.
FIGURE 26 is an enlarged detail view of another of the anti-skid devices on the tire shown in FIGURE 22.
FIGURE 27 is an end view of the anti-skid device looking in the direction of the arrows 27—27 of FIGURE 26.
FIGURE 28 is an enlarged partial view of the tire shown in FIGURE 22 showing in greater detail the mounting of the anti-skid devices thereon.
FIGURE 29 is a perspective view of a wheel rim modified for another manner of securing my anti-skid devices, either those on a tire like that of FIGURE 15 or those on a tire like that of FIGURE 22, to the tire.
FIGURE 31 is a view illustrating a convenient manner of connecting a strap, used in the mounting of one of my anti-skid devices, to one of the studs utilized in holding a wheel to a hub, such as a truck wheel.

Located on the near side of the wheel on which the tire is mounted is an annular member 48 disposed generally concentrically of the tire and radially inward of its tread. The annular member 48 is preferably made of a strong pliable plastic, of a strong rubber-like material, or of a metal strip or wire. To help hold the annular member 48 concentric with the tire and to withstand tension tending to pull it in a radially outward direction, the annular member 48 may be readily retained by a hub cap 50 interfitting in the usual manner by the annular flange portion 50A of the hub cap which engages in a press fit with the metal wheel hub. The annular member 48 extends just outwardly of flange portion 50A and under the outer circumferential edge of the hub cap 50, as shown in FIGURES 23 and 25. Thus, the hub cap 50 and particularly its inner flange portion 50A retains the annular member 48 concentrically of the tire. The annular member 48 is readily positioned in place or removed by taking off the hub cap in the usual manner.

Extending radially outward of the annular member at equidistant positions therearound, and preferably made integral therewith, are a plurality of loop portions 49 as shown. These loop portions have their respective openings disposed as illustrated.

Figure 30:
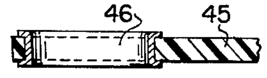
FIGURE 30 is an enlarged detail view showing the reinforced end of a rubber strap used in mounting my anti-skid devices to a tire.

Fastened to the respective loop portions 49 is a rubber strap or resilient member 45 by means of a metal hook fastener 47 secured to the lower end of each strap 45 as shown, which hook fastener 47 engages in a loop portion 49. The upper end of each rubber strap 45 is a reinforced loop end portion 46, being reinforced by a metal grommet as illustrated in FIGURE 30. The looped end 46 readily fits on and interengages with the outer hook end portion 44 of a stud-carrying anchor member 40 or 41. The hook portion of hook fastener 47 on the inner end of strap 45 is turned inwardly toward the tire and the hook portion of the outer hook end portion 44 is turned outwardly away from the tire as shown. The length of the rubber strap 45 and its resilient bias is such that upon the hook fastener 47 being fastened in a loop portion 49 on the concentrically disposed annular member 48 and the looped end portion 46 being fastened on a hook end portion 44 of an anti-skid device, the anti-skid device is held down snugly and firmly on the tire tread so as to prevent dislodgment radially outward therefrom. The flange 43 firmly engaging and pressing against the rib on the side of the groove closest to the near side of the tire resists movement of the anti-skid device axially of the tire toward the near side. The cooperation of the rib or ribs embraced by the portions 43 and 44 of the anti-skid device and the firm and resilient inward pull or tension on the portion 44 by the rubber strap 45 firmly holds the anti-skid device on the tire. The resilient inward pull exerted on the portion 44 of the anti-skid device may also be obtained by a steel coil spring for the rubber strap 45, and may also be obtained by a resilient rubber annular member 48 so interconnected with portions 44 of the anti-skid devices as to resiliently urge the portions 44 radially inward of the tire.

In some situations, the annular member 48 need not be retained in concentric position by a hub cap. When a plurality of anti-skid devices, preferably four or more, are located generally equidistantly around the circumference of the tire and connected to the annular member 48 as described at generally equidistant locations therearound, the outward radial pull on the annular member will be substantially balanced therearound so that it is maintained generally concentric of the wheel without the aid of the hub cap. However, the use of the hub cap to retain the annular member in position has the added advantage that the annular member may be retained on the wheel even when the anti-skid devices are not currently mounted on the tire, and also the advantage that the mounting of the anti-skid devices is facilitated by having the annular member retained in fixed concentric position during the mounting of the anti-skid devices to the tire.

As is apparent, the anti-skid devices may be readily mounted to the tire 36 from the near side of the tire, that is, from the side of the vehicle on which the tire is mounted. The individual anti-skid devices, both those with long anchoring members 40 and those with short anchoring members 41, are located in alternate manner around the tire. The flanges or inner hook portions 43 are moved radially inward of their respective grooves, and the outer hook portions 44 are moved radially inward along the near side of the tire so as to resiliently compress and snugly engage the tread ribs between portions 43 and 44. The hook fasteners 47 are fastened to the loop portions 49 of the annular member 48 located concentrically of the tire, preferably held there by the hub cap 50, and the rubber straps 45 secured to fasteners 47 are manually resiliently stretched and the loop end portions 46 of straps 45 are fastened to hook portions 44 of the respective anti-skid devices. The desired plurality of anti-skid devices are thus mounted at desired intervals to the tire therearound. The anti-skid devices having long and short length anchor members, which respectively extend across a plurality of ribs and across a single rib, are preferably alternately arranged around the tire.

Figure 19:
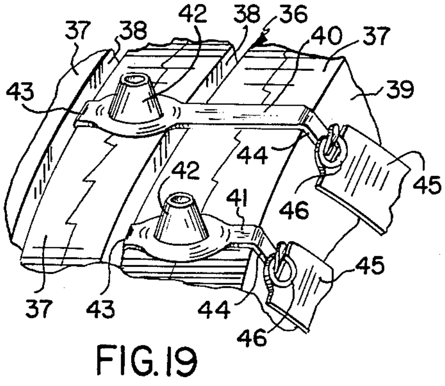
FIGURE 19 is an enlarged partial view of the tire shown in FIGURE 15 showing in greater detail the mounting of the anti-skid devices thereon.
Figure 17:
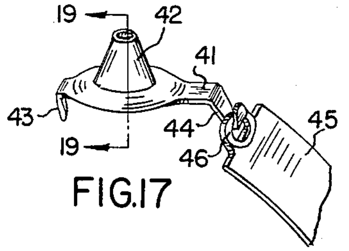
FIGURE 17 is an enlarged view of one of the devices shown in FIGURES 15 and 16 removed from the tire.
Figure 18:
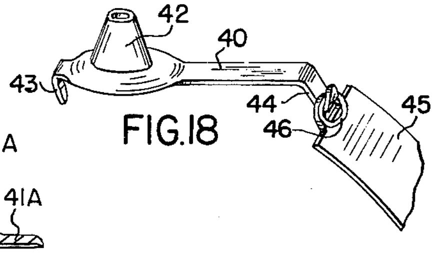
FIGURE 18 is an enlarged view of another of the devices shown in FIGURES 15 and 16 removed from the tire.
Figure 20:
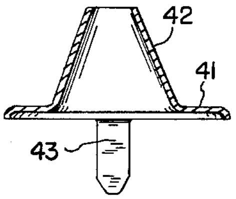
FIGURE 20 is an enlarged cross-sectional view of one of the anti-skid devices showing one construction of stud.
Figure 21:
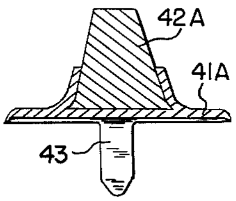
FIGURE 21 is an enlarged cross-sectional view similar to that of FIGURE 20 but showing another construction of stud.

The anti-skid devices used for mounting to a snow or mud tire, such as the tire 51 shown in FIGURE 22, and also held to the tire in a manner similar to that described in connection with the tire 36 shown in FIGURES 15, 16 and 19, is somewhat modified in structure from the anti-skid device of FIGURES 15, 16 and 19. The snow or mud tire 51 typically has a deep tread having irregularly aligned or zig-zag ribs 52 separated by irregularly aligned or zig-zag grooves or recesses 53. The anti-skid devices are formed to accommodate the form of the tread cut in the snow or mud tire.

The zig-zag rib 52 closest to the near side of the tire shown in FIGURE 22 has an outer positive corner farthest away from the near side and an inner negative corner closer to the near side of the tire. The anti-skid device that is accommodated to the outer positive rib corner farthest from the near side of the tire has an anchor member 54 dimensioned to the width of the rib at that location and which has at its end inwardly of the tread two flanges or hook end portions 56A and 56B spaced apart to straddle the corner of the rib. These hook end portions 56A and 56B, best shown in FIGURES 26, 27 and 28, are slightly tilted toward the anchor portion 54 and also toward each other so that the extreme inner or free ends of the end portions 56A and 56B tend to press into and slightly compress the rubber rib at a location inward of the outer surface of the tread upon the anti-skid device being urged in an axial direction toward the near side of the tire.

The length of the end portions 56A and 56B is also increased so as to be appropriately proportioned to the greater depth of the grooves in a snow or mud tire. The inner ends of the anti-skid device at this location are thus firmly held to the tread by the grasp of the portions 56A and 56B to the cornered sides of the rib embraced by the anti-skid device.

The other anti-skid device that is accommodated to the inner negative rib corner closer to the near side of the tire has an anchor member 55 dimensioned to the width of the rib at that location and which has at its end inwardly of the tread a single flange or hook end portion 57. This hook end portion 57, best shown in FIGURES 23, 24 and 28, is aligned with the anchor member 55, has a crease or angular form complementing the corner in which it is positioned, and is slightly tilted toward the anchor member 55 so that the extreme or free end of the end portion 57 tends to press into and slightly compress the rubber rib at a location inward of the outer surface of the tread upon the anti-skid device being urged in an axial direction toward the near side of the tire.

The length of the end portion 57 is also increased so as to be appropriately proportioned to the greater depth of the grooves in a snow or mud tire. The inner ends of the anti-skid devices at this location are thus firmly held to the tread by the grasp of the end portion 57 to the corner of the rib embraced by the anti-skid device.

Carried by and extending outwardly from anchor members 54 and 55 in road-engaging position are studs 59. These studs are of frusto-conical shape and may have the construction described in connection with FIGURES 13, 14, 20 and 21 as preferred.

The anchor members 54 and 55 of the anti-skid devices on the snow or mud tire 51 are provided at their respective outer ends closest to the near side of the tire with hook end portions 58 which are similar on both of the anti-skid devices, and which are also similar to the outer hook end portions 44 of the anti-skid devices mounted on the tire 36 shown in FIGURES 15, 16 and 19.

The mounting of the anti-skid devices to the snow or mud tire 51 is similar to that described for the mounting of the anti-skid devices to the tire 36. A similar annular member 48 is used for securing similar rubber straps 45 to the outer hook portions 58. The rib is embraced between the inner end portion 56A and 56B or 57 and the outer end portions 58 by a snug interfit slightly compressing the rubber rib and the outer end portions are firmly held to the tread by the resilient pull of the rubber straps 45 which in turn are secured to the annular member 48, which annular member 48 is preferably concentrically maintained in position by the hub cap on the wheel. In short, the means for mounting the anti-skid devices to tire 36 as described in connection with FIGURES 15, 16 and 19 is similar to the means for mounting the anti-skid devices to the snow or mud tire 51 of FIGURES 22 and 28.

A variation of securing the inner ends of resilient rubber straps 45 is illustrated in FIGURE 29. Instead of using an annular member 48, the hook fasteners 47 on the inner ends of rubber straps 45 are fastened in holes 61 provided in the rim or peripheral edge of the steel wheel disc 60, the holes 61 being distributed substantially equidistantly around the rim or edge. The straps are readily connected and disconnected as desired from the wheel by the fasteners 47 cooperating with the holes 61.

A convenient and alternate manner of anchoring the hook fasteners 47 on the inner ends of straps 45 is illustrated in FIGURE 31. In some wheels, such as truck wheels, hub caps are not utilized and the several studs which with nuts hold the steel wheel to the axle hub are exposed. In the arrangement of FIGURE 31, special metal washers 63, from a side of which a looped portion 63A extends, are held to the headed stud or nut 62 utilized for holding the steel wheel 60 to the axle hub. The washers 63 may be left on the wheels under the nuts and utilized as needed. The hook fasteners 47 secured to the radially inward ends of the respective rubber straps 45 may be readily connected and disconnected to the several loop portions 63A distributed around the wheel 60.

Figure 32:
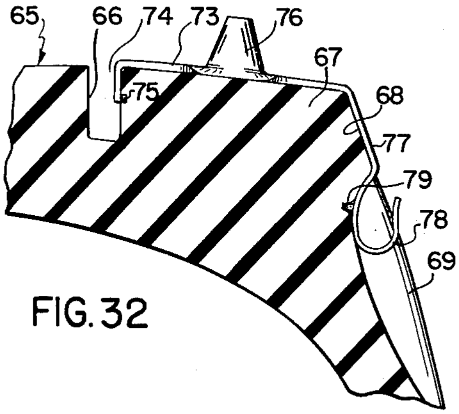
FIGURE 32 is a partial cross-sectional view of a tire structure to which another form of my anti-skid device is applied and which is particularly adapted for such tire structure.

Some tires, such as certain truck tires, have shapes or configurations to which particular modifications of my anti-skid devices may be applied. A section of such a truck tire, denoted by the reference character 65, is shown in FIGURE 32. This tire has a recess or groove 66 extending inwardly of the outer circumferential surface of the tire tread, leaving a boss or rib 67 between the recess or groove 66 and the outer side 68 of the tire. Along the sides of such a tire construction, such as outer side 68, there are a plurality of equidistantly spaced and radially extending depressions 69 of roughly elliptical or teardrop shape. These depressions 69 protrude inwardly of the tire side to leave a land of tread between each depression and the outer circumferential surface of the tire along the side 68.

The form of my anti-skid device, particularly adapted for application to the form of tire 65 shown in FIGURE 32, has a flat stud-carrying member 73 of steel or other suitable material. The member 73 has a width and general similarity to that of the stud-carrying members 40, 41, 54 and 55 shown in FIGURES 18, 17, 26 and 23, respectively, but with the modified features shown in FIGURES 32 and 33 and here described. There is a flange or inward-turned end portion 74 which is dimensioned to be readily moved radially inward of the tire into the recess 66 to where shown in FIGURE 32. It has a point or toe 75 on its side which protrudes into the tread rubber wall of the recess 66 upon the member 73 being urged toward the outer side 68 of the tire and thus helps prevent radially outward movement of the flange 74 from the recess 66 and hence dislodgment of the member 73 from the outer circumferential surface of the tire tread. The member 73 carries a stud 76 extending outwardly therefrom which stud 76 may be similar in construction to the studs 42, 42A and 59 shown in other figures.

Integrally connected to the outer end of the stud-carrying member 73 is an outer end portion 77 which in unflexed condition extends radially inward relative to the tire at about a right angle. The radial inward end of end portion 77 is curved inwardly and outwardly to form the hook or looped portion 78 shown. On the side portion 78 facing the tire 65, there is extended a point or toe 79 which protrudes into the tread rubber wall upon the portion 78 being urged against the side wall of the tire, and particularly the wall within the depression 69. This aids in preventing unintentional removal of the device from the tire.

The anti-skid device shown is preferably of steel or other appropriate material and relatively rigid, but has some resiliency, particularly the end portion 77 and its juncture with member 73. This permits end portion 77, which normally and when unrestrained has the angular inclination shown in FIGURE 33, to be resiliently flexed in a direction away from flange portion 74. When so flexed, the loop or hooked portion 78 and point 79 may clear the land of the rubber tread radially outward of the depression 69, either in mounting the anti-skid device to the tire in the intentional removal therefrom.

Figure 33:
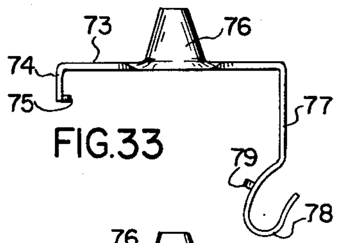
FIGURE 33 is a view of the anti-skid device shown in FIGURE 32 removed from the tire.

To mount the anti-skid device illustrated in FIGURES 32 and 33 to tire 65, the device in the unrestrained condition shown in FIGURE 33 is placed radially outward of the tire with the flange portion in line with recess 66 and end portion 77 in line with side 68. The device is then moved radially inward to position the flange portion 74 down within the recess 66, the device moved toward side 68 and the hook portion 78 manually pulled away from the tire to resiliently flex the end portion 77. Upon the end portion 77 being flexed sufficiently to allow clearance of the tread land radially outward of depression 69, the end portion 77 and hook portion 78 are moved radially inward to where the member 73 fully seats on the outer circumferential surface of the tire tread. The hook portion 78 is then released and the parts assume the relative positions illustrated in FIGURE 32. The rib or raised portion 67 of the tread between recess 66 and tire side 68 is thus embraced by the device. The hook portion 78 resiliently held in depression 69 tends to hold the device to the tire. The opposed points or toes 75 and 79 also aid in retaining the anti-skid device against dislodgment from the tire.

Although the anti-skid devices illustrated in FIGURES 32 and 33 tend to stay firmly on the tire, it may be desired to add additional restraint as a precaution so as to prevent the anti-skid devices from flying off if accidently dislodged. For this purpose, loops 46 on the ends of respective rubber straps 45 may be hooked over the hook portions 78 of this form of anti-skid device similar to the manner in which loops 46 on the ends of rubber straps 45 were hooked over the hooked ends 44 in the illustrations of FIGURES 17, 18 and 19 and over the hooked ends 58 in the illustrations of FIGURES 23 and 28. The inner ends of such rubber straps 45 may be secured to the wheel, rim, or other part disposed radially inward of the tire as shown and described in connection with other figures of the drawings.

Figure 34:
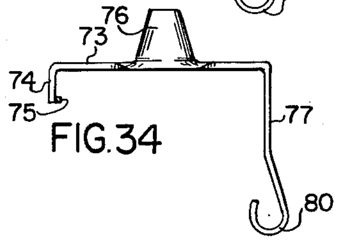
FIGURE 34 is a view of an anti-skid device like that shown in FIGURE 33 but with a variation in its outer lower end.

The anti-skid device shown in FIGURE 34 is the same as that shown in FIGURES 32 and 33 except that the hooked end portion 78 has been replaced with the hooked end portion 80. The bend and inclination of hooked portion 80 is opposite to that of hooked end portion 78 so that the throat or opening into the hook faces the tire and is within the depression 69 when the device is on the tire. When so disposed, a loop 46 on the end of a rubber strap 45 upon being placed on hooked end portion 80 cannot be readily removed or accidently dislodged except by flexing the device to move the hooked end portion away from the tire.

Figure 37:
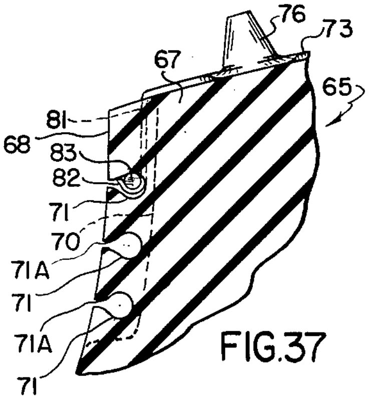
FIGURE 37 is a cross-sectional view of the tire structure shown in FIGURE 35 and including the anti-skid device there shown on the tire.
Figure 35:
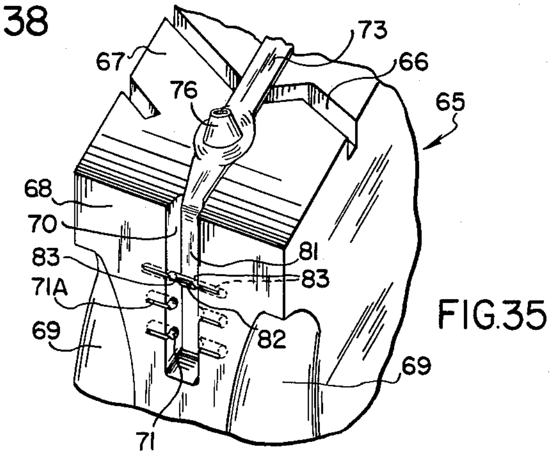
FIGURE 35 is a view of another form of my anti-skid devices mounted on a modified tire structure partially shown and which is particularly adapted for such a tire structure.

In the tire 65 shown in FIGURE 35, there is formed in the side 68 of the tread intermediate of depressions 69 a series of equidistantly spaced radially extending grooves or slots 70. These grooves or slots 70 extend down along the outer side of the tire from the outer circumferential surface of the tread to a location radially inward between depressions 69 as shown in FIGURES 35 and 37. It is to be understood that the tire is symmetrical in that depressions 69 and grooves 70 are spaced at substantially regular intervals around the tire side, the depressions 69 and slots 70 preferably being alternately arranged.

Each groove 70 has a plurality of cross-slots or transverse slots 71 extending at right angles thereto and in opposite directions from groove 70. In the form illustrated, there are three cross-slots 71, each a somewhat different distance radially inward from the outer circumferential surface of the tire tread. These cross-slots 71 each have a relatively narrow throat 71A as they gradually merge into or open up to side 68. As the rubber tread along the side 68 is somewhat resilient, as is the usual tire tread material, the side edges of these narrow throats 71A provide somewhat resiliently flexible lips which may be forcefully distorted from the normal unrestrained shape shown in FIGURES 35 and 37. The wall of the respective slots 71 nearest to the outer circumferential surface, that is, the "ceiling" of the slots 71, constitutes an overhang of rubber material in the side of the tire. The slots 71 are in effect enlarged portions of radial slot 70.

Figure 36:
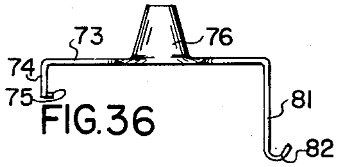
FIGURE 36 is a view of the anti-skid devices shown in FIGURE 35 removed from the tire.

The form of anti-skid device utilized for mounting to the tire 65 of FIGURES 35 and 37 has the modified form illustrated alone in FIGURE 36 and illustrated mounted on the tire 65 in FIGURES 35 and 37. The anti-skid device is generally similar to that shown in FIGURES 32 and 33 except that the outer end portion 77 and hooked portion 78 of the device shown in FIGURES 32 and 33 is replaced by end portion 81 and the hooked portion 82. The end portion 81 is constructed to interfit with, preferably complementarily between the side of, groove or slot 70 formed in the tire side 68. The length of the end portion 81 is such as to extend between the outer circumferential surface of the tire tread to the location of a cross-slot 71 to where the hooked end 82 on the free end of portion 81 is aligned with or registers with a cross-slot 71. When so located, and after the anti-skid device is in position on the tire tread and the flange portion down within recess 66, a relatively short rod or pin 83, slightly shorter than cross-slot 71 is forced into the cross-slot against the resilient resistance of the rubber lips forming the throat 71A. The anti-skid device is pressed radially inward against the resilient resistance of the rubber tread material sufficiently to permit the rod or pin 83 to enter into or interfit with the hooked end 82, whereby the parts assume the position illustrated in FIGURES 35 and 37. The pin 83 engages the overhang of rubber material provided by the "ceiling" of the slot 71 upon being urged radially outward and is thus locked in the slot 71.

Alternately, instead of first placing the flange portion 74 downwardly into the recess 66 and the point 75 there pressed against the recess wall, the hooked end 82 on the end of end portion 81 may first be hooked over a rod or pin 83 then within a cross-slot 71. The stud-carrying member is then tilted upwardly, that is, radially outward away from recess 66. With the hooked end 82 thus anchored on a rod or pin 83 within a cross-slot 71, the remainder of the anti-skid device may be swung radially inward against the outer circumferential surface of the tire and the flange portion 74 pressed downwardly into recess 66, such as to where shown in FIGURE 32. The resiliency of the device, made of steel or other suitable material, particularly of end portion 81 and its junction with stud-carrying member 73, is such as to provide, along with the resilient yieldability of the rubber tread material sufficient "give" or yielding to permit the flange portion 74 with point 75 to be forced down within recess 66 notwithstanding interengagement of hooked end 82 with a rod or pin 83.

To allow for wear of the outer circumferential surface of the tire tread and other adjustments that may be desired a plurality of cross-slots 71 are provided to permit desired radial spacing of a rod or pin 83 from the outer surface.

Figure 39:
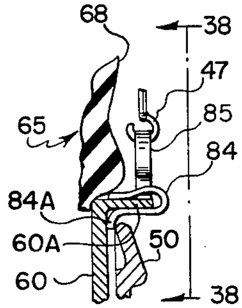
FIGURE 39 is a cross-sectional view of the arrangement shown in FIGURE 38.
Figure 38:
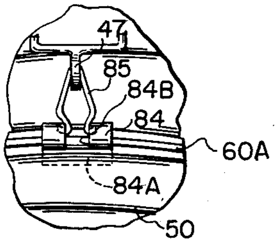
FIGURE 38 illustrates an alternate and convenient means for connecting a strap, used in mounting one of my anti-skid devices, to the rim of a wheel, looking in the direction of the arrows 38—38 in FIGURE 39.

In FIGURES 38 and 39 there is shown a novel and convenient means for securing rubber straps 45 to the rim of the automotive wheel, in those constructions in which the rim of the wheel 60 extends in a generally axial direction to form an annular head 60A. Steel spring clips 84 are mounted at intervals around the annular extent of the rim bead 60A. The clips 84 are of such a resilient nature that they can be pressed onto the bead 60A and tend to remain there because of the resilient grip of the clips on the bead. Each clip 84 has a bent or inclined portion 84A which aids in the placing of the clip on the bead. Intermediate the ends of the looped portion of each clip 84, there is an opening 84B as shown. This opening 84B is spaced from all the peripheral edges of clip 84.

A resilient clip-engaging member 85 preferably of spring steel is adapted to interengage with each clip 84. The member 85 is of general V-shape with oppositely directed hooks or fingers at the free ends of its arms. Manual pressing of the arms toward each other overcomes the resilient bias of the member 85 normally tending to spread the arms so as to move these hooks or fingers at the ends toward each other.

A member 85 is connected to each hook fastener 47 in turn secured to an end of a rubber strap 45. The fasteners 47 on the ends of a plurality of rubber straps 45, secured to anti-skid devices on the tire tread, are readily secured to respective clips 84 of a plurality of clips 84 on rim bead 60A. By compressing the arms of each member 85 and releasing them while the ends of the arms are in an opening 84B, the member is secured to a clip 84. Removal of each member 85 is accomplished by a reversal of the steps, and thereby a quick connection and disconnection may be accomplished. The inner end of the clip 84 may extend slightly under an edge of the tire as shown, and may extend slightly under the outer edge of hub cap 50, as illustrated.

The radial outward pull on the member 85 from strap 45 through fastener 47 is such that the clip 84 does not tend to be pulled in an axial direction off of the rim bead 60A. When anti-skid devices are not used on the tire, the clips 84 may be left on the rim bead 60A ready for later use when required. The arrangement illustrated in FIGURES 38 and 39 is another and convenient means of holding anti-skid devices on a tire.

It is thus seen from the above disclosure that a novel and highly useful means has been devised for adding to a tire anti-skid devices which are suitable for ready mounting and demounting to the ordinary commercially available tires, and in the case of some modifications, to tires which require but a slight change or modification. In other forms of the device, no changes or modifications in the tires are necessary. The devices are particularly useful and convenient in that they may be readily mounted and demounted as conditions warrant, with a minimum of effort and inconvenience.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. In combination with a vehicle tire of rubber-like material, said tire having a tread portion having a side wall and a generally circumferentially directed groove spaced from said wall, said tread portion having a generally circumferentially directed land portion disposed between said side wall and said groove, said land portion having an opening extending therethrough between said groove and side wall, an anti-skid device having a stud portion and an anchoring portion carrying the stud portion, said anchoring portion being extended through said opening, thence upwardly in said groove to the outer circumferential surface of said tread portion and laterally along the said outer circumferential surface to engage the same, said stud portion extending outwardly of said anchoring portion at said outer circumferential surface of the tire to protrude radially outward of said outer circumferential surface in position for anti-skid engagement with a traveled surface.

2. In combination with a vehicle tire, an anti-skid device as claimed in claim 1 in which said opening in the tire extends in a slope extending radially inward from said groove and axially toward said side wall, and in which said anchoring portion is resiliently flexible to accommodate itself to the sloping disposition of said opening in extending through said opening.

3. In combination with a vehicle tire as claimed in claim 1, and in which said opening in the land portion is inclined radially inward extending between said groove and side wall and the said anchoring portion is curved and resiliently flexible to facilitate insertion of the anchoring portion into said inclined opening from said groove.

4. In combination with a vehicle tire as claimed in claim 1, and in which said anchoring portion has a first portion extending into the said opening in the said land portion, a second portion extending radially therefrom in said groove to said outer circumferential surface of said tread portion, and a third portion connected to said second portion and offset from said first portion, said third portion having a first side formed to bite into the tread portion to resist movement along the said outer circumferential surface, said stud portion being carried by said third portion at an angle thereto to protrude radially from said outer circumferential surface.

5. An anti-skid device for an automotive tire having a tread portion of rubber-like material, a side wall along the side of the tread portion, a circumferential groove spaced axially from said side wall, said side wall and groove having a land of said tread portion therebetween, the tire having an opening through said land between said groove and side wall, said anti-skid device having an anchoring portion and a stud portion carried thereby, said anchoring portion having a first portion adapted to be inserted into said opening from said groove, a second portion extending from said first portion at an angle to the plane of said first portion and adapted to be extended therefrom through said groove radially of said tire, and a third portion disposed at an angle to the plane of said second portion and adapted to be extended along the outer circumferential surface of said tread portion in frictional engagement therewith, said stud portion being secured to said third portion and disposed to extend radially outward of said tread portion for anti-skid engagement with a traveled surface.

6. An anti-skid device as claimed in claim 5 and in which said first portion of the anchoring portion extends from said second portion in a curve toward the plane of said third portion to facilitate the insertion of said first portion into said opening from said groove.

7. An anti-skid device as claimed in claim 5 and in which said third portion at its terminus is bent radially inward to engage said tread portion radially inward of said outer circumferential surface for limiting movement of the third portion on said outer circumferential surface.

8. An anti-skid device as claimed in claim 5 and in which said third portion has a relatively sharp portion turned radially inwardly from the plane thereof to bite into the said tread portion at said outer circumferential surface.

9. An anti-skid device adapted to be mounted to a tire having a tread portion of rubber-like material, said tread portion having side walls extending circumferentally of the tread portion and a plurality of grooves therein disposed in a generally circumferential direction, said grooves being defined by additional side walls, said anti-skid device having an anchoring portion and a stud portion carried thereby, said anchoring portion having a relatively non-stretchable body portion adapted to engage the outer circumferential surface of said tread portion and to extend in a generally axial direction, said anchoring portion having end portions extending toward each other from the plane of said body portion, said anchoring portion being resiliently flexible and being biased to resiliently urge the free ends of said end portions toward each other, the free ends of said end portions being adapted to grippingly engage a pair of oppositely disposed side walls to embrace the tread portion between said oppositely disposed walls under the bias of said anchoring portion, removal of the anchoring portion from the tread portion being resiliently resisted by the rubber-like material of said tread portion at said oppositely disposed side walls, said stud portion being carried by said anchoring portion to protrude therefrom in a direction radially outward from the tire upon which said anchoring portion is mounted to engage a traveled surface.

10. An anti-skid device as claimed in claim 9 and in which said end portions of the anchoring portion are curved toward each other and the anchoring portion is resiliently flexible to resiliently resist spreading of the end portions apart from gripping engagement with said oppositely disposed side walls.

11. An anti-skid device as defined in claim 9 and in which said anchoring portion carries friction means on the side thereof for bitingly engaging the said rubber-like material at the outer circumferential surface of said tread portion to frictionally resist lateral movement of the anchoring portion along said surface.

12. An anti-skid device adapted to be removably mounted to the rubber-like tread portion of an automotive tire, the tread portion having a plurality of land portions bounded by wall portions extending generally radially of the tire, said device having an anchoring portion and a stud portion carried thereby and directed to protrude radially outward of the tire to engage a traveled surface upon the anchoring portion being mounted to said tread portion, said anchoring portion having a body portion adapted to extend along the outer circumferential surface of said tread portion in frictional engagement therewith, said anchoring portion having end portions extending away from the plane of said body portion and toward each other to define a restricted space therebetween, said anchoring portion being resiliently flexible and being biased to urge the free ends of said end portions toward each other, the free ends of said end portions being adapted to embrace one or more of said land portions and to engage and resiliently press into the said wall portions bounding the same, said restricted space between said end portions being such that the rubber-like material of the tread portion embraced by said end portions is resiliently compressed thereby, whereby the anchoring member resiliently grips the tread portion between said end portions to hold the stud portion in protruding disposition on said tire.

13. An anti-skid device as claimed in claim 12 and in which said end portions curve away from the body portion and toward each other to present opposed edges adapted to bite into the said wall portions radially inward of the plane of said body portion.

14. An anti-skid device adapted to be mounted to a tire of rubber-like material having axially spaced circumferentially directed grooves formed in the tread thereof, said grooves having generally radially directed side walls, said device comprising an anchoring portion and a stud portion carried thereby, said anchoring portion having a relatively flat body portion adapted to be disposed on the outer circumferential surface of said tread portion and end portions extending away from the plane of said body portion and away from each other to present outwardly diverging pointed ends, said body portion being resiliently flexible to permit arching thereof and moving of said pointed ends toward each other, said anchoring portion being dimensioned to permit the said end portions upon the resilient flexing of the anchoring portion to be inserted into spaced grooves and being resiliently biased to cause the pointed ends of said end portions upon release of the resilient flexing of the anchoring portion to move away from each other and press into the resilient material of the farthest spaced walls of said spaced grooves, respectively, to resiliently hold the anchoring portion to said tread, the stud portion carried by the anchoring portion being directed therefrom to protrude radially outward of a tire to which said anchoring portion is held.

15. An anti-skid device as claimed in claim 14 and in which said anchoring portion has spaced tool-engaging portions adapted to be engaged by a tool for resiliently flexing the anchoring portion.

16. An anti-skid device for attachment to an automotive tire tread of rubber-like material, said tread having a plurality of generally radially directed walls defining lands of said tread, said walls being resiliently flexible, said anti-skid device having a stud adapted to protrude radially outward of the tire, an anchor member carrying said stud in position for such radial protrusion, said anchor member having a body portion non-stretchable lengthwise adapted to extend over one or more of said lands in engagement with the outer circumferential surface of said tread, said anchor member having a first portion extending away from the plane of said body portion and adapted to extend radially inward of said tread along a said wall and having a second portion extended away from said first portion toward a said wall and protruding into the rubber-like material of said wall to resist outward radial displacement of said anchor member, said anchor member being resiliently flexible and biased to urge said second portion against said wall in opposition to the resilient resistance of the rubber-like material of said wall, said anchor member upon being held to said tread by said second portion maintaining said stud carried thereby in fixed position protruding from said tire.

17. An anti-skid device for an automotive tire having a tread of rubber-like material having radially upstanding circumferentially directed ribs thereon and a plurality of grooves separating said ribs, said ribs having generally radially disposed walls, said anti-skid device having a relatively flat and non-stretchable first portion adapted to be disposed adjacent and parallel to the outer circumferential surface of a said rib, a second portion extended from the and adapted to protrude into a wall of said groove in a groove alongside said rib adjacent a wall of said groove, and a third portion extending from said second portion and adapted to protrude into a wall of said groove in a direction transverse to a plane normal to the axis of said tire to resist removal from the tire in a radial direction, said device being resiliently flexible and biased to resiliently urge said third portion against said wall in opposition to the resilient resistance of the rubber-like material of said wall, means connected to said device adapted to engage a side of a said rib for resisting withdrawal of said third portion protruding into said wall, and a stud carried by said first portion in a position to extend radially outward of said outer circumferential surface of a said rib upon said first portion being disposed adjacent and parallel thereto for providing anti-skid engagement with a traveled surface.

18. An anti-skid device for an automotive tire of rubber-like material having a tread portion between the sides of the tire divided into ribs by a plurality of grooves, said grooves and sides having generally radially directed walls, said device comprising stud means adapted to be held in position to protrude radially outward from the outer circumferential surface of a said rib to engage a surface traveled by the tire and anchoring means carrying said stud means for holding the same in said position, said anchoring means including support means non-stretchable lengthwise adapted to engage said outer circumferential surface of a said rib and to support said stud means, first engaging means extending from said support means and adapted to protrude into a said wall to resist radially directed withdrawal thereof from a said rib, and second engaging means extended from said support means and adapted to engage a said wall to resist axially directed withdrawal of said first engaging means from its protrusion into a said wall whereby said support means may be held in engagement with said outer circumferential surface of said rib, said anchoring means being resiliently flexible and biased to urge said first engaging means to protrude into said wall in opposition to the resiliency of the rubber-like material of the tire.

19. An anti-skid device for a tire having a rib of rubber-like material protruding radially therefrom comprising the combination of a stud adapted to be extended radially outward from the outer circumferential surface of said rib to engage a surface being traveled by the tire, and an anchor for holding the stud in said extended position, said anchor having a non-stretchable first portion carrying said stud and adapted to engage said outer circumferential surface to receive radially inwardly directed thrust of said stud on said tire, a second portion carried by said first portion and directed to engage a side of a said rib to resist axially directed movement of said first portion along said outer circumferential surface, and a third portion carried by said first portion and directed to protrude into a side of a said rib at a location radially inward of said outer circumferential surface to resist outwardly radially directed movement of said first portion from said outer circumferential surface, said second and third portions cooperatively anchoring said first portion in position on said rib, said anchor being resilient and biased to resiliently urge said second portion and third portion against the said rib sides, respectively, in opposition to the resiliency of the rubber-like material of said rib sides.

20. An anti-skid device for a tire having tread lands with radially directed side walls comprising the combination of stud means adapted to protrude radially from the tire to engage a surface being traveled by the tire, relatively non-stretchable support means carrying the stud means and adapted to engage the outer circumferential surface of a said land for receiving inwardly radially directed thrust on said tire imposed by said stud means, and anchoring means carried by said support means and adapted to extend radially inward of said support means along a said side wall and in a direction axially of said tire into a said side wall at a location radially inward of said outer circumferential surface to resist radially outwardly directed movement of said support means, said anchoring being resilient and being biased to protrude in said axial direction and into said side wall at said location.

21. An anti-skid device as claimed in claim 20 and in which said anchoring means extend from opposite ends of said support means and are directed toward each other to clasp a land therebetween.

22. An anti-skid device as claimed in claim 20 and in which said anchoring means extend from opposite ends of said support means and are directed away from each other to interengage with side walls, respectively, of next adjacent lands.

23. An anti-skid device adapted to be applied to the rubber-like tread of a vehicle tire, the tire having circumferentially extending ribs defined on at least one side by a circumferentially extending groove, said device having a non-stretchable body portion adapted to extend in an axial direction of the tire and to engage the outer circumferential surface of said tread, a stud carried by the body portion and directed to extend radially outward of the tire to engage a surface being traveled by the tire, said device having a hook portion at each of its opposite ends, said hook portions having free ends directed toward each other and defining a space therebetween that is substantially less than the width of the tread to be engaged by said body portion, at least one of said hook portions having a maximum dimension in said axial direction that is less than the width of the said groove to enable said at least one hook portion to be inserted radially inward of the tire freely into the groove with said body portion extended in said axial direction, the distance between said hook portions lengthwise of the body portion disposed in said axial direction being less than the width of the tread engaged by said body portion between said hook portions in the uncompressed condition of said tread, said device being adapted to compress the tread between said hook portions by the tension of said body portion opposing the resilient reaction of the rubber tread to said hook portions upon the hook portions engaging opposite sides of the said engaged tread.

24. An anti-skid device as claimed in claim 23 and in which said device is resilient and biased to resiliently oppose spreading apart of the said free ends.

25. An anti-skid device comprising an anchoring member having a relatively non-stretchable flat body portion adapted to extend across and engage the outer surface of one or more ribs of a multi-ribbed automotive tire tread of rubber-like material having a plurality of circumferentially extending grooves dividing said ribs, stud means carried by the body portion and extending therefrom to protrude radialy outward of a said tire to engage the surface being traveled by the tire, said anchoring member having end portions extending away from the plane of said body portion and then toward each other to define between the free ends of the end portions a space less than the length of said body portions, said end portions adapted to embrace opposite sides of said one or more ribs engaged by said body portion, said end portions being dimensioned relative to the width of a said groove to permit at least the end portion positioned over a groove to be freely movable radially inward of said grooves with said body portion extended across said one or more ribs to enable said at least one end portion to be moved radially into a groove without resistance to clear one of said opposite sides, the said device having an effective length between said end portions less than the distance between said opposite sides in the uncompressed condition of said one or more ribs, said device compressing the said one or more ribs between said end portions by the tension of said body portion opposing the resilient reaction of the rubber tread to said end portions upon the end portion engaging said opposite sides of said one or more ribs.

26. A device as claimed in claim 25 and in which said anchoring member is resilient and biased to resiliently urge the said free ends of the end portions at said spaced relationship in opposition to the resilient reaction of the rubber-like material compressed therebetween.

27. An anti-skid device adapted to be applied to the rubber-like tread of a vehicle tire, the tire tread having ribs extending generally circumferentially of the tire separated by grooves, said anti-skid device comprising a relatively non-stretchable stud-carrier member having a body portion adapted to be positioned on the outer surface of said tread in a generally axial direction across one or more of said ribs with one end of the body portion extended to a side of said tire tread, an end portion disposed at an angle to said body portion at the other end of the body portion, said end portion being adapted to be disposed within a said groove to engage a side thereof upon the body portion being urged toward said side of the tire tread, stud means carried by said body portion to protrude radially outward of a tire upon which the stud-carrier member is mounted to engage the round surface traveled by the tire, a holding member adapted to be disposed and maintained generally concentrically of the tire radially inwardly of said tread, and a resilient member connecting said holding member and said one end of said body portion to urge said body portion radially inward against said tread whereby the stud-carrying member is held in anti-skid position on the tire.

28. An anti-skid device as claimed in claim 27 and in which said holding member has a central open space accommodating the hub cap of the wheel upon which the said tire is mounted whereby the holding member is maintained generally concentrically of the tire by the hub cap centering the holding member.

29. An anti-skid device as claimed in claim 27 and in which said one end of the body portion and said resilient member have complementary readily connectable and disconnectable interengaging portions whereby the stud-carrier member may be quickly connected to and disconnected from the resilient member.

30. An anti-skid device adapted to be applied to the rubber-like tread of a vehicle tire mounted on a wheel having a hub cap centrally disposed on the outer side of the wheel, the hub cap centrally of the wheel and having an annular flange extending in an axial direction and engaging the wheel, the tire tread having grooves extending therearound dividing the tread into ribs, said anti-skid device comprising in combination a stud-carrier member having a body portion disposable over the outer tread surface in a generally axial direction, a stud protruding outwardly of the body portion, and a rib-engaging portion disposable in a said groove and engageable with a side of a rib defining the said groove to limit axially directed movement of the stud-carrier member toward the outer side of the tire, the rubber-like material of the rib providing resilient resistance to axially directed movement of the stud-carrier member toward said outer side, a holding member having a central opening therein accommodating said flange of the hub cap and maintained generally concentrically disposed on said outer side of the wheel by said flange, and connecting means connecting said holding member and said stud-carrier member to maintain said stud-carrier member on said tread and the rib-engaging portion thereof against said side of the rib.

31. An anti-skid device as claimed in claim 30 and in which said connecting means includes resilient means for resiliently urging the stud-carrier member against said tread and the rib-engaging portion thereof against said side of the rib.

32. An anti-skid device as claimed in claim 30 and in which said connecting means includes ready attachable and detachable means for the quick connection and disconnection of said stud-carrier member from said holding member.

33. Anti-skid apparatus comprising the combination of stud means adapted to be placed on the outside surface of a rubber tire tread to protrude radially therefrom in position for engaging the road surface traveled by the tire, said tread having a plurality of recesses dividing the tread into raised portions, hook means carried by said stud means and adapted to extend radially inward of a said recess and engage the side thereof closest to the outer side of the tire holding means adapted to be located on the outer side of said tire, substantially concentrically thereof and radially inward thereof, centering means for maintaining said holding means substantially concentrically of the tire and radially inward thereof, and connecting means connecting said stud means and said holding means for holding the stud means urged toward said outer side of the tire and on the outside surface of the tire tread.

34. Apparatus as claimed in claim 33 and in which said holding means and centering means comprise an annulus adapted to interfit with a wheel hub cap disposed centrally of the tire on said outer side of the tire carrying an engaging portion adapted to interengage with said connecting means.

35. Apparatus as claimed in claim 33 and in which said connecting means and holding means include resilient means for resiliently urging said hook means toward said outer side of the tire and said stud means radially inward on the outside surface of the tread.

36. The combination of an annular member adapted to be mounted about the flange of a hub cap on a vehicle wheel having a rubber tire mounted thereon, a studded member adapted to be mounted on the outer surface of the tire tread, said studded member having an inner end portion protrudable into a recess or groove of the tire tread to engage a side thereof closest to the outer side of the tire, said studded member having an outer end portion extendable radially inward from the outer surface of the tire tread along the outer side of the tire, and a connecting member connecting said annular member and said outer end portion of the studded member for holding the studded member to said tire tread.

37. Apparatus for application to a tire having ribs and grooves, the combination of a plurality of anti-skid devices, each said anti-skid device having a body portion adapted to overlie one or more ribs, each of said anti-skid devices at its opposite ends having first and second end portions adapted to embrace said one or more ribs therebetween, each of said first end portions being adapted to be positioned in a said groove with the body portion engaging the outer peripheral surface of said one or more ribs, said each of said first end portions being inclined toward a side of the tire to protrude into an adjacent rib upon being urged toward said side of the tire so as to resist radial outward movement from the groove, the first means disposed concentrically of the tire on said side thereof radially inward from the outer surface of the tread, and second means respectively interconnecting the second end portions, respectively, of said anti-skid devices on said side of the tire to the said first means.

38. Apparatus as claimed in claim 37 including in said first and second means resilient means for resiliently urging said anti-skid devices radially inward on said side of the tire.

39. In apparatus for application to a tire on a wheel, the tire having recesses and raised portions forming a tire tread, the combination of an anti-skid device having a body portion adapted to overlie one or more raised portions, end portions adapted to embrace said one or more raised portions therebetween, one of said end portions being disposable in a said recess to engage a side thereof and the other of said end portions being disposable alongside said tire, a connecting member attachable to the said other of said end portions alongside said tire, and attaching means secured to said wheel radially inwardly of said tire for attaching said connecting means to said wheel, said connecting members and attaching means including resilient means whereby a resilient radially inward pull is exerted on the said other of said end portions attached to the connecting member.

40. Apparatus as claimed in claim 39 and in which said attaching means comprise a washer member held to the wheel by the threaded studs securing the wheel to the axle hub, the washer member having a loop portion to which the connecting means is readily engaged and disengaged.

41. Apparatus as claimed in claim 39 and in which said attaching means comprise a clip member resiliently mounted on the rim of the wheel adjacent the tire and engaging member readily engageable and disengageable with the clip member for engaging the connecting means to said clip member.

42. An anti-skid device for a tire having a recess extending radially inward into the tread from the outer circumferential surface thereof at a distance from a side of the tire and a depression in the tire on said side thereof leaving a land of rubber tread between the depression and outer circumferential surface of said tread, said device comprising a stud-carrying member having a body portion disposable on said tread circumferential surface between said recess and said tire side, a stud carried by and extending radially outward from said body portion, said stud-carrying member having a flange portion extending at an angle to said body portion radially inward of the tire and disposable in said recess to engage a side wall thereof, said stud-carrying member having an outer end portion extending at an angle to said body portion radially inward of the tire along said side of the tire, said outer end portion having a terminal portion displaced from the plane of the outer end portion and extending from said plane toward the tire wall to protrude into said depression and engage the wall thereof, said stud-carrying member being resiliently yieldable to permit said outer end portion to be flexed away from said tire and at a greater angle to said body portion so as to permit the outer end portion including said terminal portion to clear said land, the stud-carrying member upon being moved radially inward of the tire positioning said outer end portion alongside of said land and said terminal portion protruding into said depression whereby the stud-carrying member embraces the tire tread between said recess and said tire side.

43. An anti-skid device as claimed in claim 42 and in which said terminal portion is looped for selective engagement with connecting means anchored radially inward of the tire.

44. An anti-skid device for a tire having a recess extending radially inward into the tread from the outer circumferential surface thereof at a distance from a side of the tire and a radial slot formed in the side of the tire extending radially inward from said outer circumferential surface, said radial slot having a transverse slot disposed at an angle thereto from an overhang in the side of the tire, said anti-skid device comprising a stud-carrying member having a body portion adapted to extend over the tread between the recess and said tire side, a stud carried by the body portion and extending radially of the tire, said stud-carrying member having an inner end portion formed to extend radially inward of the tire from said body portion into said recess for engagement with a wall thereof, said stud-carrying member having an outer end portion formed to extend radially inward of the tire from said body portion in said radial slot to be accommodated therein, said outer end portion having a terminal portion displaced from the plane thereof in a direction away from the said inner end portion, and a pin member positionable in said transverse slot for engagement with said overhang in the side of the tire, said pin member in said transverse slot being interengageable with said terminal portion of the outer end portion in said slot to resist radially outward movement of the outer end portion from said slot.

45. The combination of an anti-skid device having a body portion disposable on the outer circumferential surface of the tire, an inner end portion disposed at an angle to the body portion and adapted to extend radially inward into a radially extending recess in the tire tread to engage a side wall thereof, an outer end portion disposed at an angle to the body portion and adapted to extend radially inward of the tire adjacent a side of the tire, a tire having said tread, said recess being located at a distance from said side of the tire, said tire having a radial slot formed in the side of the tire and extending radially inward of the tire from said outer circumferential surface, said slot having an enlarged portion at a location radially inward of said outer cricumferential surface to provide an overhang in the side of the tire, and anchoring means disposed in said enlarged portion of the slot to engage said overhang upon being urged radially outward and adapted to connect with and anchor said outer end portion of the anti-skid device to prevent radially outward displacement of said outer end portion from said radial slot.

46. For an automotive tire having a tread of rubber-like resilient material on its outer peripheral surface and bounded on opposite axial ends of the tire by sides converging with the opposite sides, respectively, of said tires, the said tread having at least one groove intermediate the sides of the tread extending radially inward from said peripheral surface and defined by opposing walls, the improvement of an anti-skid device having a body portion adapted to engage the said outer peripheral surface of the tread intermediate of said groove and a said side of the tread, a stud portion carried by said body portion and disposed to extend radially outward from said peripheral surface of the tread upon said body portion being in engagement therewith, an inner engaging portion carried by the said body portion and disposable in said groove in position to be forcibly pressed into one of said opposing walls of the groove to resiliently compress the same upon the body portion being shifted in a direction relative to the sides of the tire tread to force said inner engaging portion against said one opposing wall, said inner engaging portion being of a size to permit it to be readily inserted into said groove prior to being forcibly pressed into a said defining wall and resiliently compressing the same, and an outer engaging portion carried by said body portion and disposable adjacent a first of said opposite sides of the tire tread in position to firmly press upon the tire tread at said first side upon the inner engaging portion being positioned in said groove and pressed against said one of the opposing walls whereby to snugly embrace the tire tread between said groove and said first side for maintaining the anti-skid device in position on the tire tread.

47. An anti-skid device as claimed in claim 46 and including auxiliary means for assisting in holding the said anti-skid device on the tire tread, said auxiliary means including a spider having centering means on a side of the tire corresponding to said first side of the tire tread and arm means extending radially outward therefrom and connected to said outer engaging portion of the anti-skid device to oppose radially outward movement of the outer engaging portion relative to the tire tread.

48. An anti-skid device as claimed in claim 47 and in which said auxiliary means includes resilient means resiliently opposing radially outward movement of said outer engaging portion relative to the tire tread.

References Cited by the Examiner

UNITED STATES PATENTS

| | | | |
|---|---|---|---|
| 2,441,670 | 5/1948 | Morrone | 152—225 |
| 2,696,238 | 12/1954 | Jarvis | 152—230 |
| 2,746,508 | 5/1956 | Doughty | 152—218 |

ARTHUR L. LA POINT, *Primary Examiner.*

W. HAEFELE, *Assistant Examiner.*